(12) United States Patent  
Yamaguchi et al.

(10) Patent No.: US 8,138,904 B2  
(45) Date of Patent: Mar. 20, 2012

(54) TIRE INTERNAL PRESSURE ALARM DEVICE

(75) Inventors: Shigeru Yamaguchi, Kodaira (JP);  
Takao Kokubu, Akishima (JP)

(73) Assignee: Bridgestone Corporation, Tokyo (JP)

( * ) Notice: Subject to any disclaimer, the term of this patent is extended or adjusted under 35 U.S.C. 154(b) by 435 days.

(21) Appl. No.: 12/377,080

(22) PCT Filed: Aug. 10, 2007

(86) PCT No.: PCT/JP2007/065715  
§ 371 (c)(1),  
(2), (4) Date: Feb. 10, 2009

(87) PCT Pub. No.: WO2008/018585  
PCT Pub. Date: Feb. 14, 2008

(65) Prior Publication Data  
US 2010/0148950 A1    Jun. 17, 2010

(30) Foreign Application Priority Data

Aug. 11, 2006 (JP) ................................. 2006-219796  
Nov. 8, 2006 (JP) ................................. 2006-303014

(51) Int. Cl.  
*B60C 23/00* (2006.01)  
*B60C 23/02* (2006.01)

(52) U.S. Cl. ........ 340/442; 340/445; 340/448; 340/449; 340/451; 73/146; 73/146.2; 73/146.8; 250/431

(58) Field of Classification Search .................... 340/442  
See application file for complete search history.

(56) References Cited

U.S. PATENT DOCUMENTS

| | | | | |
|---|---|---|---|---|
| 2,249,867 | A | * | 7/1941 | Snelling ..................... 73/335.08 |
| 5,430,330 | A | * | 7/1995 | Takahama et al. ............ 257/788 |
| 7,565,832 | B2 | * | 7/2009 | Huang ......................... 73/146.8 |
| 2002/0046599 | A1 | * | 4/2002 | Chuang et al. .................. 73/146 |

FOREIGN PATENT DOCUMENTS

| | | |
|---|---|---|
| JP | 06-005742 A | 1/1994 |
| JP | 2002-144830 A | 5/2002 |
| JP | 2003-146033 A | 5/2003 |
| JP | 2005-047466 A | 2/2005 |
| JP | 2005-257297 A | 9/2005 |
| JP | 2007-296966 A | 11/2007 |
| WO | WO-99/29524 | * 6/1999 |

* cited by examiner

*Primary Examiner* — George Bugg  
*Assistant Examiner* — Anthony D Afrifa-Kyei  
(74) *Attorney, Agent, or Firm* — Sughrue Mion, PLLC

(57) ABSTRACT

An elastic member 11 positioned between an inner surface of a casing 2 and a front face of a pressure sensing portion 8 of a pressure sensor 1 reduces a possibility of liquid and foreign matters in a tire directly reaching the pressure sensing portion 8. The elastic member also increases adhesiveness between the pressure sensing portion 8 of the pressure sensor 1 and a labyrinth structure and further prevents a potting agent 9b from flowing into the sensing portion 8. Moreover, the elastic member 11 is a member constituting at least a part of the labyrinth structure, so that it does not need that a wall is provided on the pressure sensor 1 and a dedicated seal member is provided on the pressure sensing portion 8.

8 Claims, 3 Drawing Sheets

TIRE INTERNAL PRESSURE ALARM DEVICE

TECHNICAL FIELD

The present invention relates to a tire internal pressure alarm device which is attached to a rim of a vehicle, detects an internal pressure of a tire, and sends information of the internal pressure to a receiver in the vehicle via radio waves. The present invention may apply to many kinds of pressure sensors attached in a wheel.

RELATED ART

A system using such a tire internal pressure alarm device can notify a driver of a tire internal pressure trouble based on tire internal pressure information received by the receiver. The tire internal pressure alarm device of this kind has a pressure sensor for detecting a tire internal pressure and electronic components for processing signals with regard to the internal pressure which are embedded in a casing. The tire internal pressure alarm device is provided with pressure introduction passages for introducing the internal pressure from a pressure introduction aperture formed on an outer surface of the casing to a pressure sensing portion of the pressure sensor. These electronic components are composed of a transmitter for transmitting the detected pressure signals as a radio wave to a receiver in a vehicle, a controller for controlling the transmission of the pressure signals and the like, and are embedded in an electronic substrate. JP 06 5742 A, for example, describes that an electronic components is surrounded and potted with a resin for protecting the electronic components embedded in a casing.

When electronic components are surrounded and potted with a resin, a potting agent with low-viscosity is used to coat the electronic components so that the resin flows around the electronic component. However, in a pressure sensing portion of the pressure sensor where the potting agents is not desired to flow into, a wall having a larger height than that of the pressure sensor needs to be provided on the pressure sensor or a dedicated seal member needs to be provided on the pressure sensing portion of the pressure sensor in order to prevent the potting agent from entering into the pressure sensing portion.

Meanwhile, a labyrinth structure has to be arranged on the front face of the pressure sensing portion of the pressure sensor to prevent foreign objects from directly intruding it. Thus, the area also needs to be sealed because a potting agent impregnates between the labyrinth structure and the pressure sensing portion.

DISCLOSURE OF THE INVENTION

The present invention aims to provide a tire internal pressure alarm device capable of preventing a potting agent from flowing into a sensing portion of the pressure sensor without a wall provided on the pressure sensor or a dedicated seal member provided on the pressure sensing portion.

A tire internal pressure alarm device according to the present invention having a casing in which a pressure sensor for detecting an internal pressure of a tire and electronic components for processing signals with regard to the internal pressure are embedded, the casing being provided with a pressure introduction passage for introducing the internal pressure from a pressure introduction aperture formed on an outer surface of the casing to a pressure sensing portion of the pressure sensor, wherein an elastic member constituting at least a part of a labyrinth structure is positioned between an inner surface of the casing and a front face of the pressure sensing portion of the pressure sensor.

In the tire internal pressure alarm device according to the invention, the elastic member constituting at least a part of the labyrinth structure is positioned between the inner surface of the casing and the front face of the pressure sensing portion of the pressure sensor. Therefore, this not only can reduce a possibility of liquid and foreign objects in the tire directly reaching a pressure sensing portion but also can enhance adhesion (sealing property) of the pressure sensing portion of the pressure sensor with the labyrinth structure to further prevents the potting agent from flowing around the sensing section of the pressure sensor. As a result, it is possible to prevent a soft potting agent, which is superior in flowing around the electronic components, from flowing around the pressure sensing portion of a pressure sensor without providing a wall on the pressure sensor and a dedicated seal member on the a pressure sensing portion of the pressure sensor.

Preferably, the potting agent is provided on a portion covering the electronic components. More preferably, a hard potting agent having superior water resistance and corrosion resistance than those of the potting agent is deposited on the potting agent. In this way, there is provided a double layer structure in which the soft potting agent, which is superior in flowing around the electronic components, is arranged as the first layer on the portion directly covering the electronic components and the hard potting agent, which is superior in water resistance and corrosion resistance, is deposited as the second layer on the first layer. This double layer structure allows the potting agent to completely flowing around a section except for the pressure sensing portion.

The wall portion defining the pressure introduction passage is formed by the inner surface of the casing and the elastic member such that the wall portion has a wall surface section perpendicular to a traveling direction of a path directing from the pressure introduction aperture to the pressure sensing portion, which enables to further reduce a possibility of liquid and foreign objects in a tire directly reaching the pressure sensing portion.

The pressure introduction passage has a main path section and a branch path branched from the main path section at a right angle, so that a possibility of liquid and foreign matters in a tire directly reaching the pressure sensing portion can be further reduced.

The device has at least the two pressure introduction apertures, so that when the tire internal pressure of the tire is removed to perform maintenance on the tire internal pressure alarm device, liquid and foreign objects accumulated in the pressure introduction passage can be cleaned by flowing high pressure air into one pressure introduction aperture and discharging said air from the other pressure introduction apertures.

Preferably the pressure sensor has a housing on which the pressure introduction aperture is formed and a moisture sensing sheet provided in the housing at a position corresponding to the pressure introduction aperture.

In the pressure sensor used in the tire internal pressure alarm device, it is assumed that a direct cause of failures that may arise in a TPMS pressure sensor attached in a wheel rim and subjected to use is derived from a mechanical factor and an electric factor as well as an environmental factor such as a temperature and moisture.

For the failures caused by a mechanical damage, breakage or the like and the failures caused by a damage of an electric or electronic component or the like, it is possible to find out the cause of the failures by taking apart the actual sensor or conducting a power-on test of the sensor, and to take necessary measures against these causes. However, it is very difficult to find out the cause of the failures derived from a use environment of the pressure sensor because there heretofore is no means for specifically identifying the use environment.

Upon considering the failure of a pressure sensor mainly composed of electronic components caused by an environmental factor, the pressure sensor is given basically a water resistance in view of reliability and measures against moisture in the tire by warning the user not to enter water in a tire and use dry air as an inflating gas. However, the inside of the tire is practically in a high temperature and humidity condition so that the pressure sensor is likely to suffer from failures caused by both of the temperature and humidity under such an environment.

In general, the pressure sensor is more likely to suffer from failures caused by a humidity condition than by a temperature condition. Therefore, for example, if it is possible to clearly determine whether an inner adhesion of water exists in the pressure sensor or not, the cause of the failure can be analyzed more accurately and appropriately. On the other hand, it enables to figure out a use condition of a tire by a user and to speculate a usage trend of a tire user to take measures for a further failure provision.

According to the pressure sensor used in the tire internal pressure alarm device of the present invention, an existence or nonexistence of exposure history to water, for example, can be always precisely determined for a pressure sensor being once used and damaged by inspecting, preferably with eyes, a moisture sensing sheet contained in the housing whether the sheet has detected moisture or not. Therefore, it is possible to surely determine whether there is a risk of failures caused by a humidity or not and to analyze the cause of the failures more precisely and appropriately.

This is particularly effective in a case where a printing sheet printed with a water-soluble coloring agent is used as a moisture sensing sheet and bleedings and flow spots of the water-soluble coloring agent are purposely arisen when the moisture sensing sheet once get wet with water, which allows a sign showing the water exposure to clearly leave on the sheet even after the sheet dried afterward.

A preferable moisture sensing sheet is a printing sheet composed of a Japanese paper, a Western paper, a plastic sheet, a rubber sheet or the like printed with a water-soluble coloring agent such as a paint, red food coloring or the like.

BEST MODE FOR CARRYING OUT THE INVENTION

With reference to the drawings, an embodiment of the tire internal pressure alarm device and the pressure sensor according to the present invention will be discussed.

Figure 1:
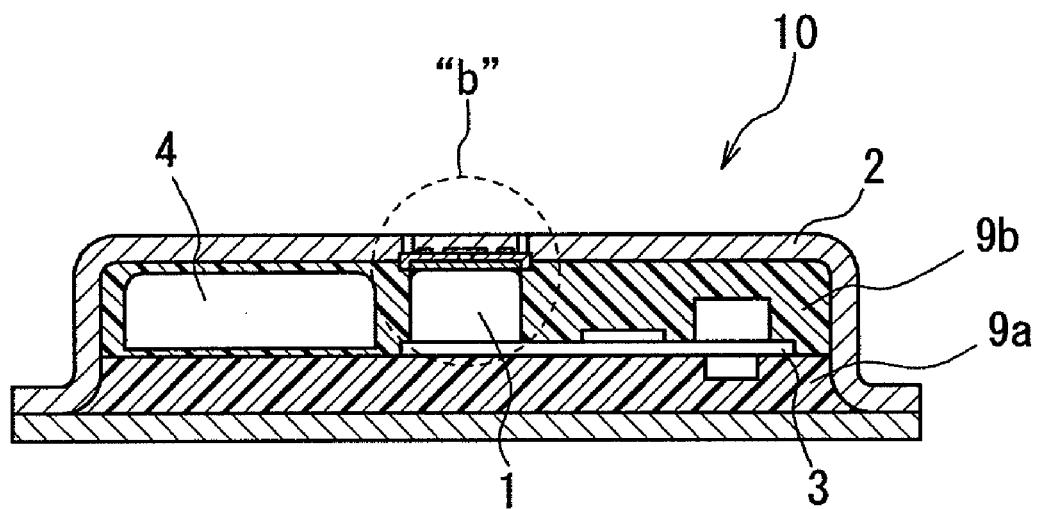
FIG. 1 is a cross-sectional view of a tire internal pressure alarm device according to the present invention.
Figure 2:
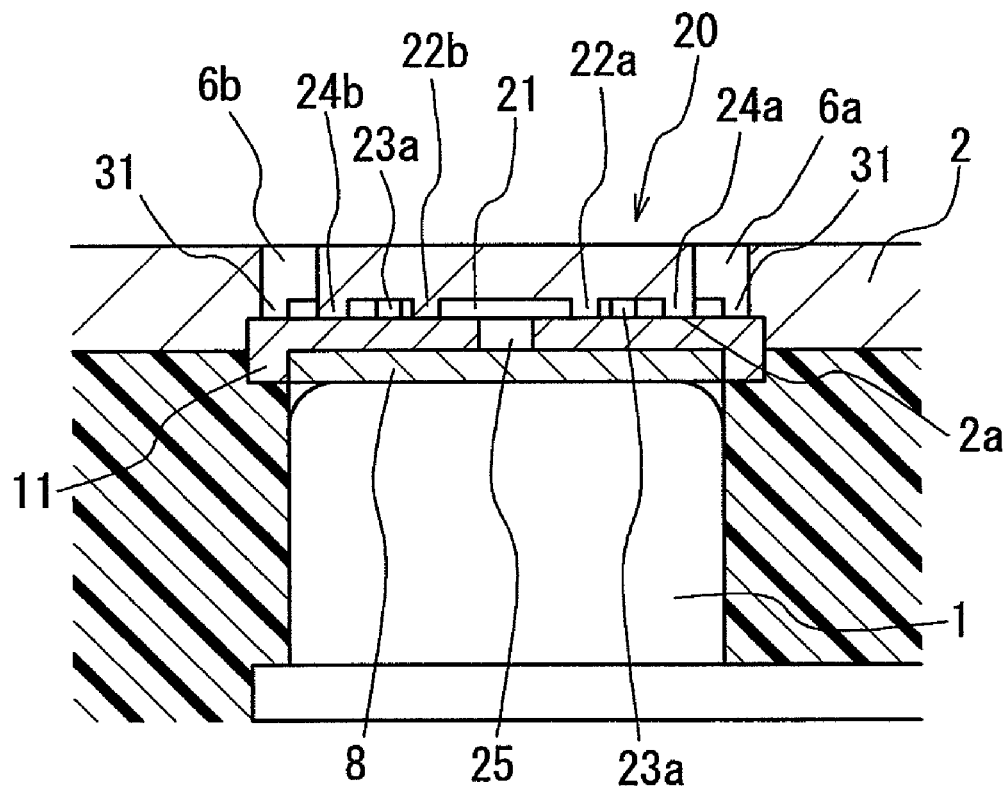
FIG. 2 is an enlarged cross-sectional view of a part indicated as "b" in FIG. 1.

FIG. 1 is a cross-sectional view of a tire internal pressure alarm device according to the present invention, and FIG. 2 is an enlarged cross-sectional view of a part indicated as "b" in FIG. 1. The tire internal pressure alarm device 10 has a casing 2 embedded with a pressure sensor 1 for detecting an internal pressure of a tire, a transmitter for transmitting the detected pressure signals as a radio wave to a receiver in a body of a vehicle, an electronic substrate 3 equipped with the electronic components such as a controller for controlling the transmission of the pressure signals, and a battery 4 for supplying electricity to these sections.

The electronic substrate 3 equipped with the electronic components is potted with a soft potting agent 9b, which is superior in flowing around the electronic components, to be fixed on the casing 2, and the pressure sensor 1 and the battery 4 are potted by a hard potting agent 9a, which is superior in water resistance and corrosion resistance, to be fixed on the casing 2.

An elastic member 11 such as rubber is inserted in the section of the casing 2 corresponding to the position of the pressure sensor 1, and a diaphragm 8 which is a pressure sensing portion is attached between the pressure sensor 1 and the elastic member 11. A hole 25 for introducing pressure to the diaphragm 8 is formed in the elastic member 11, and a pressure introduction passage 21 for introducing the tire internal pressure to the pressure sensing portion 8 of the pressure sensor 1 is formed on a surface 2a bordering the casing 2 and the elastic member 11.

Figure 3:
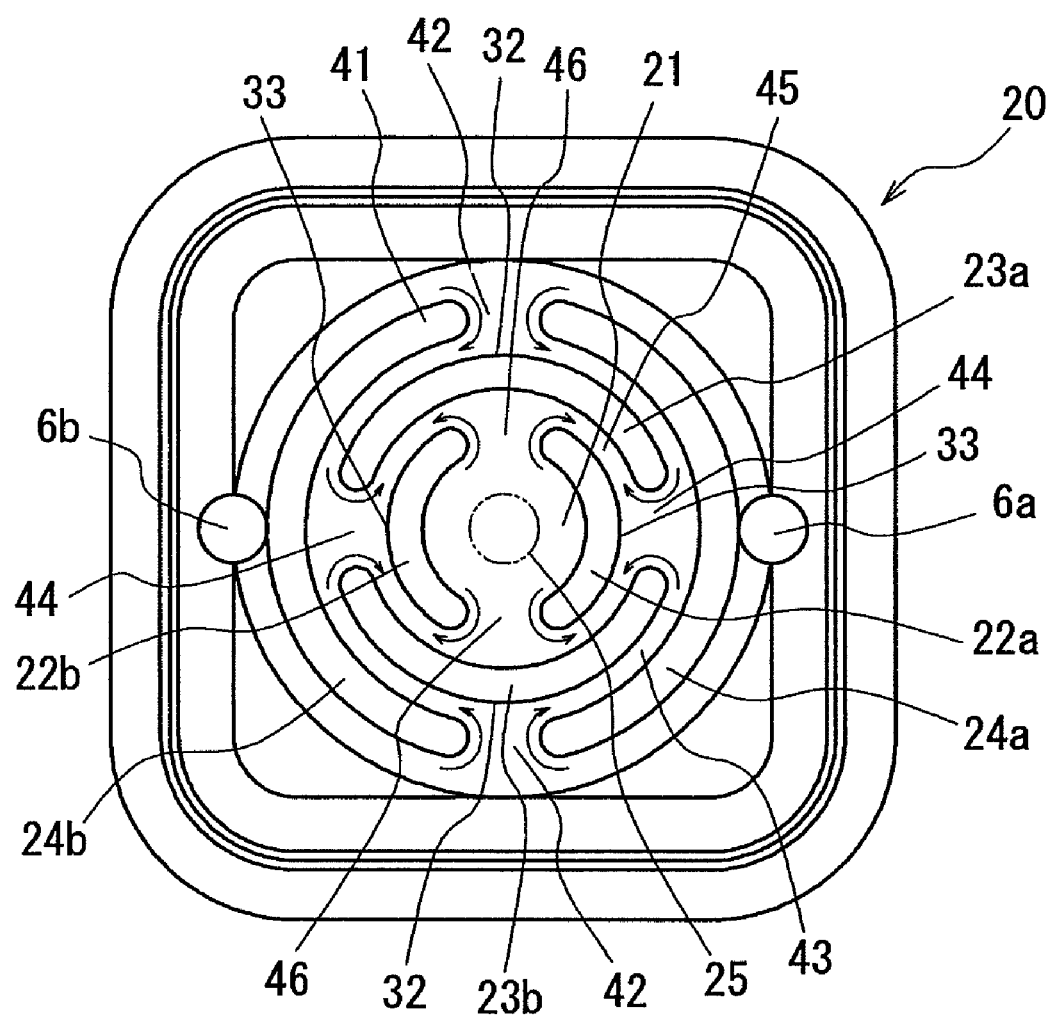
FIG. 3 shows an inner surface of a section on the casing corresponding to the position of a pressure sensor.

FIG. 3 shows an inner surface of a section on the casing corresponding to the position of the pressure sensor. Two through holes 6a, 6b functioning as pressure introduction apertures are formed on the casing 2 to introduce air to the pressure introduction passage 21 which continues from the through holes 6a, 6b. The pressure introduction passage 21 has a labyrinth structure which is defined by the inner surface of the casing 2 and the elastic member 11 coating the front face of the pressure sensing portion 8 and starts from the through holes 6a, 6b, runs around the wall sections 22a, 22b, 23a, 23b, 24a, and 24b, passes the hole 25 of the elastic member 11, and reaches the pressure sensing portion 8 of the pressure sensor 1.

According to this embodiment, the elastic member 11 positioned between the inner surface of the casing 2 and a front face of the pressure sensing portion 8 of the pressure sensor 1 not only reduces a possibility for liquid and foreign objects in a tire directly reaching a pressure sensing portion, but also increases adhesiveness (sealing property) between the pressure sensing portion 8 of the pressure sensor 1 and the labyrinth structure and further prevents the potting agent 9b from flowing around the pressure sensing portion 8 of the pressure sensor 1. That is, by using the elastic member 11, the potting agent 9b does not enter between the inner surface of the casing 2 and the elastic member 11, and between the elastic member 11 and the pressure sensing portion 8 of the pressure sensor 1. Moreover, the elastic member 11 is a member constituting at least a part of the labyrinth structure, so that it does not need that a wall is provided on the pressure sensor 1 and a dedicated seal member is provided on the pressure sensing portion 8 of the pressure sensor 1.

Moreover, since the potting agent 9b is provided as the first layer on the portion directly covering the electronic components and the potting agent 9a is deposited as the second layer on the first layer to form a double layer structure, the potting agent 9b can flow around the entire portions except for the pressure sensor 1.

In the present embodiment, wall sections 31, 32, 33 perpendicular to the traveling direction of the passage are arranged on at least one point of the passage between the through holes 6a, 6b which is the pressure introduction passages and the pressure sensing portion 8. This reduces a possibility of liquid and foreign objects in the tire reaching the pressure sensing portion 8.

The pressure introduction passage 21 has branched path sections 42, 44, 46 branched from the main path sections 41, 43, 45, which extend smoothly, toward the pressure sensing portion 8. This further reduces a possibility of liquid and foreign matters in the tire reaching the pressure sensing portion 8.

Two through holes 6a and 6b serve as pressure introduction apertures of the pressure introduction passage 21. This can easily blow and clean the inside of the pressure introduction passage 21 by suctioning high pressure air into one pressure introduction aperture and discharging the air from the other pressure introduction aperture.

Figure 4:
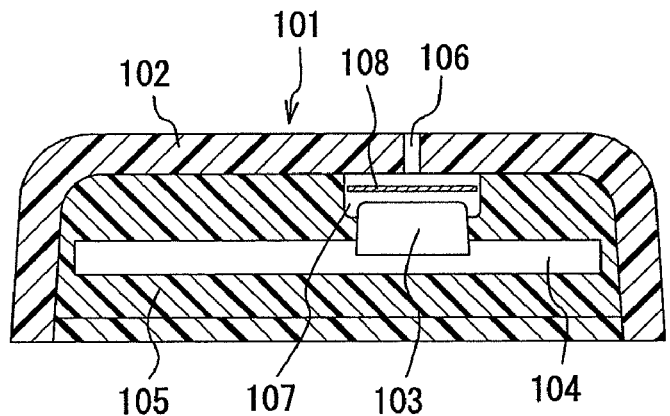
FIG. 4 is a vertical cross-sectional view schematically showing an example of the pressure sensor used in the tire internal pressure alarm device according to the present invention.

FIG. 4 is a vertical cross-sectional view illustrating an embodiment of the pressure sensor used in a tire internal pressure alarm device according to the present invention. In this figure, the reference numeral 201 generally denotes a pressure sensor and the reference numeral 202 denotes a housing of the pressure sensor.

In a housing 102 which may be composed of a molded article of a plastic material or the like and has an airtight outer frame structure, a pressure detection portion 103 and an electronic component mounting substrate 104 are contained. These components 103 and 104 are surrounded by a sealant 5 composed of an epoxy resin, for example, so that they are secured to the housing 102 and they, particularly the electronic component mounting substrate 104, are protected from a humidity.

Herein, the pressure sensor 101, especially the pressure detection portion 103 is generally provided with moisture resistance on not only a section directly exposed to the surrounding air but also the other sections by means of a chemical film coating or the like, providing a desirable heat resistance in a semiconductor level.

In the present embodiment, the housing 102 is provided with the at least one pressure introduction aperture 106 which is placed at a position corresponding to the pressure detection portion 103 and opens to the inside of the tire, as well as a space 107 for detecting the pressure in the housing disposed between the pressure introduction aperture 106 and the pressure sensing portion 103. A moisture sensing sheet 108, preferably a printing paper printed with a water-soluble coloring agent such as a paint, a food red, a aqueous ink or the like is arranged in the pressure detection space 107.

The moisture sensing sheet 108 herein may be, for example, a sheet impermeable for pressure. In this case, the tire internal pressure introduced from the pressure introduction aperture 106 runs around the moisture sensing sheet 108 and then is supplied to the pressure detection portion 103.

Meanwhile, the term "printing" may relate to any of letters, figures, symbols, images and the like, and the printing as used herein includes not only literally printing, but also coating, copying, character printing, and handwriting.

Once the pressure sensor 101 thus composed is subjected to water, moisture or the like and a moisture attaches to the moisture sensing sheet 108, this fact can be certainly confirmed preferably by a phenomena of bleedings, flow spots or the like of the water-soluble coloring agent on the printing sheet at any time, so that the cause of the failure in the pressure sensor 101 can be analyzed more precisely with a higher reliability.

Figure 5:
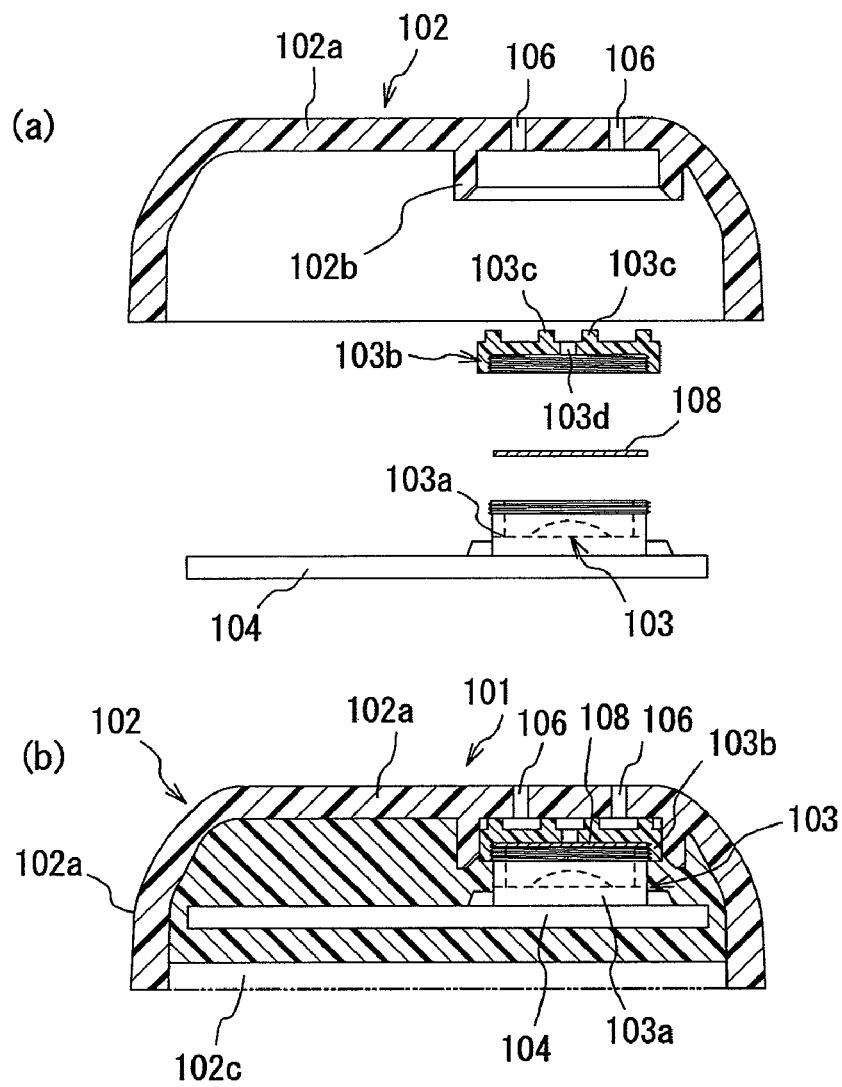
FIG. 5 is a cross-sectional view similar to FIG. 4 illustrating a process of assembling the pressure sensor.

FIG. 5 shows an illustrative assembling process of the pressure sensor. In this process, the pressure sensing portion 103 and electronic component mounting substrate 104 are firstly in an assembled state as shown in FIG. 5, and the moisture sensing sheet 108 is pinched and fixed on the a main body part 103a of the pressure detection section 103 via the screw cap 103b. Then, the pressure detection portion 103, more directly the screw cap 103b is engaged with the inward rib 102b provided on an upper section 102a of the housing 102 to be positioned and fixed as shown in FIG. 5(b). Thereafter, the sealant 5 is filled in the odd space of the upper section 102a, and a bottom substrate 102c of the housing 102 is attached on the upper section 102a by means of adhesion, deposition or the like as shown by a dotted line in FIG. 102(b). In this way, the odd space is tightly closed to constitute the pressure sensor 101.

The pressure sensor 101 as shown in FIG. 5 is provided with two pressure introduction apertures 106 in the housing 102, a linear projection 103c for forming a circumvent passage for pressure on the outer surface of the hinge cap 103b, and one through hole 103d on the center portion of the cap 103b. In this way, the configuration of the pressure sensor 101 is slightly different from that showed in FIG. 4. However, this pressure sensor can also exert the same effect as described above under the action of the moisture sensing sheet 108.

Therefore, in the pressure sensor 101 as shown in FIG. 5, a section between the top face of the main body section 103a of the pressure detection portion 103 and the inner face of the upper section 102a of the housing 102 corresponds to the above-mentioned pressure detection space 107.

The present invention is not limited to the above-mentioned embodiments and various variations and modifications are possible.

For example, although the embodiment in which a potting agent having a double structure is potted has been discussed above, the potting agent with a single layer or three or more layers may be potted. In addition, although a case having two pressure introduction apertures has been discussed above, three or more pressure introduction apertures may be exist.

The invention claimed is:

1. A tire internal pressure alarm device having a casing in which a pressure sensor for detecting an internal pressure of a tire and electronic components for processing signals with regard to the internal pressure are embedded, the casing being provided with a pressure introduction passage for introducing the internal pressure from a pressure introduction aperture formed on an outer surface of the casing to a pressure sensing portion of the pressure sensor, wherein an elastic member constituting at least a part of a labyrinth structure is positioned between an inner surface of the casing and a front face of the pressure sensing portion of the pressure sensor.

2. The tire internal pressure alarm device according to claim 1, wherein a potting agent is provided on a portion covering the electronic components.

3. The tire internal pressure alarm device according to claim 1, wherein a hard potting agent having superior water resistance and corrosion resistance than those of the potting agent is deposited on the potting agent.

4. The tire internal pressure alarm device according to claim 1, wherein a wall portion defining the pressure introduction passage is formed of the inner surface of the casing and the elastic member such that the wall portion has a wall surface section perpendicular to a traveling direction of a path directing from the pressure introduction aperture to the pressure sensing portion.

5. The tire internal pressure alarm device according to claim 1, wherein the pressure introduction passage has a main path section and a branch path branched from the main path section at a right angle.

6. The tire internal pressure alarm device according to claim 1, comprising at least the two pressure introduction apertures.

7. The tire internal pressure alarm device according to claim 1, wherein the pressure sensor comprises a housing on which the pressure introduction aperture is formed and a moisture sensing sheet provided in the housing at a position corresponding to the pressure introduction aperture.

8. The tire internal pressure alarm device according to claim 7, wherein the moisture sensing sheet is a sheet printed with a water-soluble coloring agent.

* * * * *